Patented Jan. 27, 1925.

1,524,435

UNITED STATES PATENT OFFICE.

ADDISON F. HOFFMAN AND WILLIAM M. PARKIN, OF PITTSBURGH, PENNSYLVANIA.

PICKLING LIQUOR AND PROCESS.

No Drawing.  Application filed January 22, 1923. Serial No. 614,316.

*To all whom it may concern:*

Be it known that we, ADDISON F. HOFFMAN and WILLIAM M. PARKIN, both citizens of the United States, residing at Pittsburgh, in the county of Allegheny and State of Pennsylvania, have invented new and useful Improvements in Pickling Liquors and Processes, of which the following is a specification.

The present invention relates to improvements in pickling metals, and constitutes an improvement on Patent No. 1,221,735 issued to Hoffman and Parkin.

In the process of said prior patent, sulfite waste liquor such as is left when wood or similar material is boiled with a solution of calcium bisulfite or calcium sulfite in sulphurous acid, is first neutralized with an alkali such as lime, is then concentrated to the form of a thick syrupy mass or even to dryness and some of the concentrated material is then added to the acid pickle liquor used in pickling ferrous metal articles, such as a cast iron or steel, to remove the surface rust or scale therefrom, to leave a clean metal surface. After extensive research, we have now found that the neutralization of the waste sulfite liquor before evaporation is an unnecessary and undesirable step, for the reason that the sulfite waste liquor when concentrated, preferably in vacuo, without the addition thereto of lime, soda or other alkali, is far superior for use with the pickle liquor.

It is well known that in the pickling of ferrous metal articles with acid, there is usually evolved hydrogen gas, carrying therewith a relatively small amount of droplets of the acid solution, in the form of a mist of fine particles, frequently referred to in the trade as "fume." This fume is more or less injurious to the health of the workmen and is uncomfortable and hence causes a lowering of the efficiency of the workmen, and also it does considerable damage to buildings and to metallic products in the vicinity of the pickling vats. It is well known that mist containing acid, striking iron articles leaves the same in a condition in which they will rapidly rust and corrode. The concentrated sulfite waste liquor of the prior patent referred to was added for producing more or less surface tension in the pickling solution, so that the escaping hydrogen would be filtered or cleansed from the mist of liquid particles.

By the use of the sulfite liquor concentrated without the addition of lime or other alkali, a more persistent foam is produced on the pickling bath from the same amount of the concentrated sulfite liquor, and the foam also acts as an insulator to prevent loss of heat from the bath, thereby greatly reducing the amount of fog in the winter time in the pickling house. Where the acid contains a gas dissolved in water, such as hydrochloric acid, the foam blanket holds the gas in solution, preventing loss of hydrochloric acid gas. Both of these effects are produced in a greater degree, by the use of sulfite waste liquor which has been concentrated without the addition of alkali, especially lime, before the concentration. This concentrated product will hereinafter be referred to as "acid concentrated sulfite waste liquor."

In the preferred mode of operation of our invention the sulfite waste liquor as it comes from the digestors in which wood or like material has been digested, is first filtered or otherwise treated to separate insoluble foreign materials from the liquor. It is then run without any chemical treatment into a concentrating pan in which it is concentrated preferably in vacuo and out of contact with air. This concentration can be carried to any desired degree, for example, a thick syrup having a gravity of about 30 to 32° Bé., can be produced, or the liquid can, if desired, be evaporated to dryness. The waste liquor, treated as above referred to, contains very little free sulphurous acid, since this escapes mostly during the concentration operation. During the cooking operation a considerable proportion of the sulfites may have been converted into sulphates. During the concentration there may be more or less precipitation and the precipitate can be removed from the hot liquor by filtration, at any stage of the concentration operation.

The pickling of ferrous metal articles in acid pickle containing the neutralized and concentrated sulfite liquor sometimes produces a black skin or coating on the metal articles, whereas the acid-concentrated material does not produce this effect. The acid-concentrated material is more effective, the same amount producing a greater increase in surface tension and hence a thicker layer of the foam on the pickling bath. While both the acid-concentrated material and the neutralized concentrated material are substantially neutral to some of the indicators, it is found that the neutralized-concentrated liquor when added to the pickling bath, neutralizes more or less of the acid of the bath, whereby it becomes necessary to add slightly greater amounts of acid to the bath, in order to have the same acidity of the bath for pickling purposes. The acid-concentrated sulphite liquor when added to the pickling bath seems to act to prevent to some extent at least, action of the acid of the bath, on the clean metal surface, whereby the operation of the pickling is largely confined to the scale or rust on the ferrous metal articles under treatment. This causes a reduction in the amount of loss of weight of the ferrous metal articles.

Heretofore it has been well known that a portion of the hydrogen formed by the action of the acid on the metal was absorbed by the metal, and this has to be removed by an annealing treatment after the pickling operation. The absorption of hydrogen by the metal produces more or less brittleness in the ferrous metal article. If the annealing were to be omitted, the subsequent escape of the absorbed hydrogen may cause the flaking off of the coating of the ferrous metal articles, thus for instance, blisters on enameled ware, are frequently caused by not completely driving off absorbed hydrogen taken up by the metal during the pickling operation. The use of acid-concentrated sulphite waste liquor seems to prevent, to a large extent at least, the absorption of the hydrogen during the pickling operation. Another effect of the absorption of hydrogen by the ferrous metal articles being pickled is a decrease in the strength thereof. For example, it was noted that steel bars breaking at 80,000 pounds before pickling broke at 60,000 pounds after pickling by the ordinary method, but in cases where the acid-concentrated sulfite liquor was added to the pickling bath, there was no appreciable difference between the breaking strength on the pickled and unpickled bars. In cases where the small amount of hydrogen absorbed in the presence of acid-concentrated sulfite liquor is objectionable, the time of annealing will be much less than would be necessary if the pickling were performed without the acid concentrated liquor.

When the acid-concentrated sulfite liquor is added to the pickle the amount of acid necessary in the bath, to clean the metal was found to be reduced by about 20% in some cases, this also saving a considerable amount of metal which would be dissolved by the addition of a quantity of acid, were the sulfite liquor not added.

It has furthermore been found by experiment that on account of the fact that the surface of the pickled ferrous metal articles is smoother when the acid-concentrated sulfite liquor is added, hence considerably less tin or zinc is needed to coat the pickled product. This saving in tin or zinc may amount to five or ten pounds per ton of pickled metal.

Sulfite waste liquor as the same comes from the digestors is a highly complex body, containing very many substances, both organic and inorganic in solution. It is believed that the addition of acids and lime, or lime alone, or other alkali alone, to the waste sulfite liquor, causes a precipitation of certain of the ingredients thereof, which are useful in the pickling process. For the purpose of the present invention, it is immaterial as to what these substances are, and we do not limit the invention to any particular theory of why the acid-concentrated material should be better than the neutralized concentrated material, but content ourselves with noting some of the specific advantages in the use of the acid-concentrated material.

The quantity of the sulfite waste liquor to be added will depend upon many factors and in general it may be stated that enough of the material should be added to substantially increase the surface tension of the pickle liquor, so that a relatively persistent foam will be produced on the pickle liquor. In the following examples, proportions are stated for the purpose of illustration and not as limiting the invention thereto.

*Example 1.*

For pickling wrought iron pipes having a relatively heavy coating or scale, a bath containing 100 gallons of water, 80 pounds of sulphuric acid, and ⅛ pound of the acid-concentrated sulfite liquor of about 30°–32° Bé., gave good results.

*Example 2.*

Sheet steel rolled plates on which the scale coating was relatively thin, were pickled in a bath containing, 100 gallons of water, 40 pounds of hydrochloric acid and ¼ pound of the acid concentrated sulfite liquor.

*Example 3.*

For pickling castings, having a rather thick coating of rust, a solution containing, in each 100 gallons of water, about 100 pounds of hydrochloric acid, and ⅛ pound of acid-concentrated sulfite liquor of about 30°–32° Bé., gave good results.

*Example 4.*

For pickling iron rods to be subsequently galvanized, these being made of mild steel, a pickle bath was produced containing per 100 gallons of water, 100 pounds of sulphuric acid and ½ pound of the acid-concentrated sulfite liquor of about 30° Bé.

*Example 5.*

For pickling steel rods to be subsequently cold drawn, a pickle bath was produced containing per 100 gallons of water, 100 lbs. of 60° Bé. sulphuric acid and 1½ lbs. of the acid concentrated sulfite liquor of 30°-32° Bé.

We claim:

1. A process of pickling ferrous metal articles, which comprises subjecting the same to the action of an acid pickling bath containing "acid-concentrated" sulfite waste liquor.

2. An acid pickle liquor containing a mineral acid of a strength adapted for pickling ferrous metal articles, and containing "acid concentrated" sulfite waste liquor including those constituents of the original liquor which would be precipitated or destroyed by boiling with excess of lime, and those constituents which would be precipitated or destroyed by boiling in a neutral state.

In testimony whereof we affix our signatures.

ADDISON F. HOFFMAN.
WILLIAM M. PARKIN.